United States Patent
Yan et al.

(10) Patent No.: US 9,209,899 B2
(45) Date of Patent: Dec. 8, 2015

(54) METHOD AND APPARATUS FOR ADAPTIVE NONLINEAR EQUALIZATION IN A POLARIZATION MULTIPLEXING OPTICAL COMMUNICATION SYSTEM

(71) Applicant: FUJITSU LIMITED, Kawasaki (JP)

(72) Inventors: Weizhen Yan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 505 days.

(21) Appl. No.: 13/661,741

(22) Filed: Oct. 26, 2012

(65) Prior Publication Data

US 2013/0108260 A1    May 2, 2013

(30) Foreign Application Priority Data

Oct. 28, 2011    (CN) .......................... 2011 1 0333936

(51) Int. Cl.
*H03H 7/30* (2006.01)
*H03H 7/40* (2006.01)
*H03K 5/159* (2006.01)
(Continued)

(52) U.S. Cl.
CPC ........ *H04B 10/2572* (2013.01); *H04B 10/2543* (2013.01)

(58) Field of Classification Search
CPC ........... H04B 10/2572; H04B 10/2543; H04B 10/58; H04B 10/6163; H04L 27/01
USPC ........................................... 375/232; 398/25
See application file for complete search history.

(56) References Cited

U.S. PATENT DOCUMENTS

2008/0089417 A1    4/2008    Bao et al.

FOREIGN PATENT DOCUMENTS

| CN | 1812525 | 8/2006 |
| CN | 101242506 | 8/2008 |

(Continued)

OTHER PUBLICATIONS

Zhenning Tao; Liang Dou; Weizhen Yan; Yangyang Fan; Lei Li; Shoichiro Oda; Yuichi Akiyama; Hisao Nakashima; Takeshi Hoshida; Jens C. Rasmussen; "Complexity-reduced digital nonlinear compensation for coherent optical system," Next-Generation Optical Communication: Components, Sub-Systems, and Systems II, Proc. of SPIE, vol. 8647, 86470K-1. (Janua.*

(Continued)

*Primary Examiner* — Nader Bolourchi
(74) *Attorney, Agent, or Firm* — Staas & Halsey LLP

(57) ABSTRACT

A method and apparatus for adaptive nonlinear equalization, comprising: a horizontal polarization component compensation unit configured to calculate a linear damage value of an input signal, a nonlinear damage value of a horizontal component of the input signal, and a crosstalk value caused by a vertical component to the horizontal component, and compensate the horizontal component according to the linear damage value, the nonlinear damage value and the crosstalk value; and, a vertical polarization component compensation unit configured to calculate a linear damage value of the input signal, a nonlinear damage value of a vertical component of the input signal, and a crosstalk value caused by a horizontal component to the vertical component, and compensate the vertical component according to the linear damage value, the nonlinear damage value and the crosstalk value. With the present invention, Intra-channel nonlinear damage of a polarization multiplexing optical communication system is effectively compensated.

12 Claims, 4 Drawing Sheets

(51) Int. Cl.
*H04B 10/2507* (2013.01)
*H04B 10/2543* (2013.01)

(56) References Cited

FOREIGN PATENT DOCUMENTS

| | | |
|---|---|---|
| CN | 101442365 | 5/2009 |
| CN | 101453269 | 6/2009 |

OTHER PUBLICATIONS

Zhaoyi Pan ; Chatelain, B. ; Chagnon, M. ; Plant, D.V., "Volterra filtering for nonlinearity impairment mitigation in DP-16QAM and DP-QPSK fiber optic communication systems," 2011 Optical Fiber Communication Conference and Exposition (OFC/NFOEC) and the National Fiber Optic Engineers Conference, pp. 1-3.*

Yan Gao ; Fan Zhang ; Juhao Li ; Liang Liu ; Zhangyuan Chen ; Lixin Zhu ; Li Li ; Anshi Xu; "Experimental demonstration of nonlinear electrical equalizer to mitigate intra-channel nonlinearities in coherent QPSK systems," 35th European Conference on Optical Communication, ECOC '09, 2009 , pp. 1-2.*

Chinese Office Action issued Feb. 13, 2015 in corresponding Chinese Patent Application No. 201110333936.2.

Pan et al., "Volterra Filtering for Nonlinearity Impairment Mitigation in DP-16QAM and DP-QPSK Fiber Optic Communication Systems", OSA/OFC/NFOEC, 2011, 3 pp.

Gao et al., "Experimental Demonstration of Nonlinear Electrical Equalizer to Mitigate Intra-channel Nonlinearities in Coherent QPSK Systems", ECOC 2009, Vienna, Austria, Sep. 2009, 2 pp.

* cited by examiner calculating a linear damage value of an input signal, a nonlinear damage value of a component of the input signal in a horizontal direction and a crosstalk value caused by a component of the input signal in a vertical direction to the component of the input signal in a horizontal direction according to the input signal, and compensating the component of the input signal in a horizontal direction according to the linear damage value, the nonlinear damage value and the crosstalk value calculating a linear damage value of the input signal, a nonlinear damage value of a component of the input signal in a vertical direction and a crosstalk value caused by the component of the input signal in a horizontal direction to the component of the input signal in a vertical direction according to the input signal, and compensating the component of the input signal in a vertical direction according to the linear damage value, the nonlinear damage value and the crosstalk value

Fig. 9

METHOD AND APPARATUS FOR ADAPTIVE NONLINEAR EQUALIZATION IN A POLARIZATION MULTIPLEXING OPTICAL COMMUNICATION SYSTEM

CROSS-REFERENCE TO RELATED APPLICATIONS

This application claims the benefit under 35 U.S.C. Section 119 of Chinese Application No. 201110333936.2 filed on Oct. 28, 2011 in the Chinese Patent Office, which is hereby incorporated by reference in its entirety into this application.

TECHNICAL FIELD

The present invention relates to communications, and in particular to a method and apparatus for adaptive nonlinear equalization in a polarization multiplexing optical communication system.

BACKGROUND ART

Phase noise and waveform damage caused by self-phase modulation (SPM) or intra-channel nonlinearity are one of the sources leading to cost of a long-haul transmission optical communication system. In a coherent optical communication system, adaptive nonlinear equalization (ANLE) of a digital coherent receiver is used to compensate for nonlinear damage of self-phase modulation (as stated in Y. Gao, ECOC2009, paper 9.4.7; Z. Pan, OFC2011, paper JThA40).

Such conventional methods of adaptive nonlinear equalization are all based on a Volterra model of a single-polarization system. That is, only nonlinear damage of a single-polarization signal itself is only taken into consideration. However, intra-channel nonlinear damage of a polarization multiplexing optical communication system contains both nonlinear damage of two single-polarization signals (x-polarization signal and y-polarization signal) and crosstalk between the two single-polarization signals caused by non-linearity of the optical fiber. Therefore, conventional methods cannot well compensate for intra-channel nonlinear damage of a polarization multiplexing optical communication system. For example, in the reference "Z. Pan, OFC2011, paper JThA40", conventional adaptive nonlinear equalization was used in a polarization multiplexing optical communication system, and the result showed that the performances were not desired.

It should be noted that the above introduction to the background art is given for the clear and complete description of the technical solution of the present invention and for the understanding by those skilled in the art. The above technical solutions should not be deemed as being known to those skilled in the art for having been described in the background art of the present invention.

SUMMARY OF THE INVENTION

The object of the embodiments of the present invention is to provide a method and apparatus for adaptive nonlinear equalization in a polarization multiplexing optical communication system, so that intra-channel nonlinear damage in a polarization multiplexing optical communication system is more effectively compensated for.

According to an aspect of the embodiments of the present invention, there is provided a nonlinear compensation apparatus used in an adaptive nonlinear equalizer, comprising:

a horizontal polarization component compensation unit configured to calculate a linear damage value of an input signal according to the input signal, calculate a nonlinear damage value of a component of the input signal in a horizontal direction and a crosstalk value caused by a component of the input signal in a vertical direction to the component of the input signal in a horizontal direction according to the input signal, and compensate the component of the input signal in a horizontal direction according to the linear damage value, the nonlinear damage value and the crosstalk value; and a vertical polarization component compensation unit configured to calculate a linear damage value of the input signal according to the input signal, calculate a nonlinear damage value of a component of the input signal in a vertical direction and a crosstalk value caused by a component of the input signal in a horizontal direction to the component of the input signal in a vertical direction according to the input signal, and compensate the component of the input signal in a vertical direction according to the linear damage value, the nonlinear damage value and the crosstalk value.

According to another aspect of the embodiments of the present invention, there is provided a receiver used for a polarization multiplexing optical communication system, comprising:

a receiver front end;
a dispersion compensation apparatus connected to the receiver front end;
an adaptive nonlinear equalizer connected to the dispersion compensation apparatus;
a frequency offset compensation apparatus connected to the adaptive nonlinear equalizer;
a carrier phase recovery apparatus connected to the frequency offset compensation apparatus;
a data recovery apparatus connected to the carrier phase recovery apparatus;
wherein the adaptive nonlinear equalizer is implemented through the nonlinear compensation apparatus as stated above.

According to still another aspect of the embodiments of the present invention, there is provided a polarization multiplexing optical communication system, comprising the receiver as stated above.

According to a further still aspect of the embodiments of the present invention, there is provided an adaptive nonlinear compensation method, comprising:

a horizontal polarization component compensation step of calculating a linear damage value of an input signal, a nonlinear damage value of a component of the input signal in a horizontal direction and a crosstalk value caused by a component of the input signal in a vertical direction to the component of the input signal in a horizontal direction according to the input signal, and compensating the component of the input signal in a horizontal direction according to the linear damage value, the nonlinear damage value and the crosstalk value; and a vertical polarization component compensation step of calculating a linear damage value of the input signal, a nonlinear damage value of a component of the input signal in a vertical direction and a crosstalk value caused by the component of the input signal in a horizontal direction to the component of the input signal in a vertical direction according to the input signal, and compensating the component of the input signal in a vertical direction according to the linear damage value, the nonlinear damage value and the crosstalk value.

The advantages of the embodiments of the present invention exist in that a nonlinear equalizer applicable to a polarization multiplexing optical communication system is constructed by adding a part representative of crosstalk between two single-polarization signals in a nonlinear item to which a delay tap of an adaptive nonlinear equalizer corresponds, thereby more effectively compensating for intra-channel nonlinear damage of a polarization multiplexing optical communication system.

In the following description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

FIG. 9 is a flowchart of an adaptive nonlinear compensation method of an embodiment of the present invention.

DETAILED DESCRIPTION OF THE INVENTION

The foregoing and other features of the embodiments of the present invention will be apparent through the following description with reference to the drawings. These embodiments are merely illustrative and not intended to limit the present invention. For the easy understanding of the principle and the embodiments of the present invention by those skilled in the art, the description of the embodiments of the present invention will be given taking a filer comprising a Volterra model as an example; however, it should be understood that the embodiments of the present invention are not limited to such a model.

Figure 1:
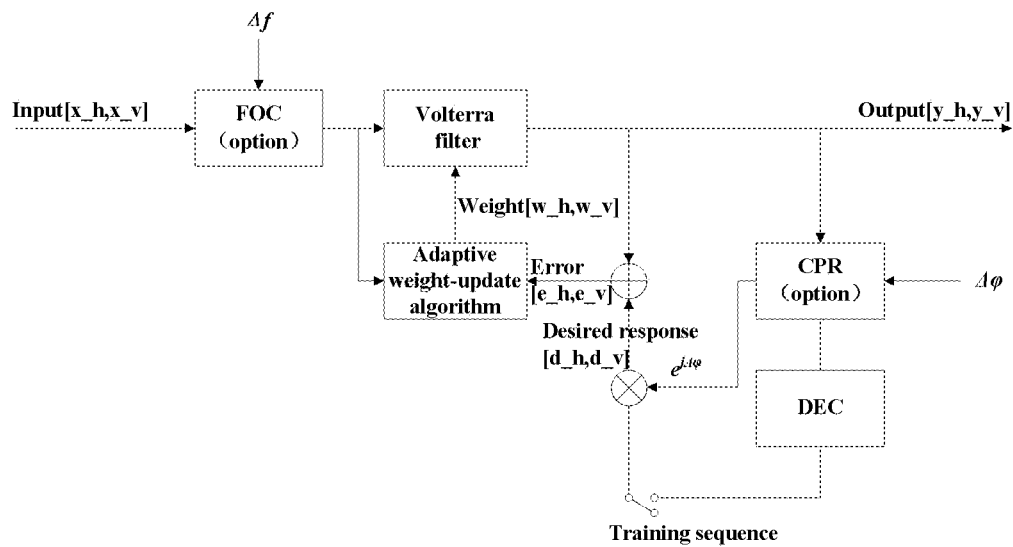
FIG. 1 is a schematic diagram of the structure of a dual-polarization adaptive nonlinear equalizer of an embodiment of the present invention.

FIG. 1 is a schematic diagram of the structure of a dual-polarization adaptive nonlinear equalizer (DP-ANLE) of an embodiment of the present invention. Referring to FIG. 1, its main body is a Volterra filer, with the weight of the filer being updated by using an adaptive weight-update algorithm, such as RLS (recursive least square) and LMS (least mean squares). A desired response is offered by a training sequence or decision (DEC). An error signal is a difference between the current output and the desired response. If there exists influence of a frequency offset, a frequency offset compensation (FOC) unit may be provided, in which $\Delta f$ is frequency offset evaluation value that is fed back. If there exists influence of a phase noise, a carrier phase recovery (CPR) unit may be provided, in which $\Delta \phi$ is phase noise evaluation value that is fed back. Here, the desired response needs to be multiplied by the phase noise in calculating the error signal, as shown in FIG. 1.

Based on the adaptive nonlinear equalizer shown in FIG. 1, the method and apparatus for adaptive nonlinear equalization of a polarization multiplexing optical communication system of an embodiment of the present invention is provided, which shall be described in detail in particular embodiments below.

Embodiment 1

Figure 2:
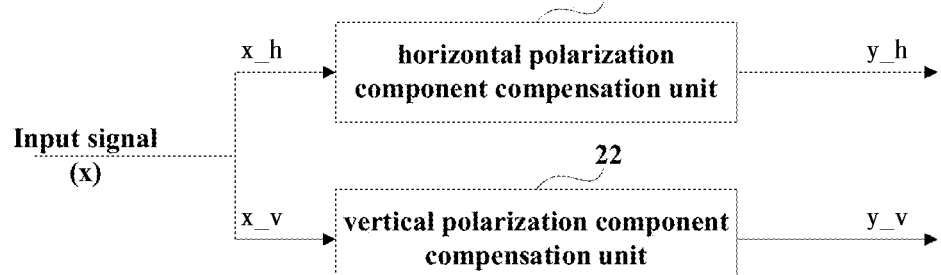
FIG. 2 is a schematic diagram of the composition of a nonlinear compensation apparatus of an embodiment of the present invention.

An embodiment of the present invention provides a nonlinear compensation apparatus. FIG. 2 is a schematic diagram of the composition of the nonlinear compensation apparatus of the embodiment of the present invention. Referring to FIG. 2, the apparatus comprises:

a horizontal polarization component compensation unit 21 configured to calculate a linear damage value of an input signal according to the input signal, calculate a nonlinear damage value of a component of the input signal in a horizontal direction and a crosstalk value caused by a component of the input signal in a vertical direction to the component of the input signal in a horizontal direction according to the input signal, and compensate the component of the input signal in a horizontal direction according to the linear damage value, the nonlinear damage value and the crosstalk value; and a vertical polarization component compensation unit 22 configured to calculate a linear damage value of the input signal according to the input signal, calculate a nonlinear damage value of a component of the input signal in a vertical direction and a crosstalk value caused by a component of the input signal in a horizontal direction to the component of the input signal in a vertical direction according to the input signal, and compensate the component of the input signal in a vertical direction according to the linear damage value, the nonlinear damage value and the crosstalk value.

The horizontal polarization component compensation unit 21 of the embodiment shall be described in detail below with reference to FIG. 3.

In an embodiment, in calculating the linear damage value of the input signal by the horizontal polarization component compensation unit 21, the linear damage value of the input signal comprising a linear damage value of the component of the input signal in a horizontal direction (hereinafter referred to as horizontal component of the input signal) and a linear damage value of the component of the input signal in a vertical direction (hereinafter referred to as vertical component of the input signal). Wherein, the linear damage value of the horizontal component of the input signal is a product of the values of the horizontal component of the input signal at sampling timings (n−p, where n is the timing of an output signal, and p is a time interval, p∈(−∞~+∞)) for each sampling point and the coefficients of linear items of the horizontal component to which the sampling timings (n−p) for each sampling point correspond. Likewise, the linear damage value of the vertical component of the input signal is a product of the values of the vertical component of the input signal at sampling timings (n−p, where n is the timing of an output signal, and p is a time interval, p∈(−∞~+∞)) for each sampling point and the coefficients of linear items of the vertical component to which the sampling timings (n−p) for each sampling point correspond.

In an embodiment, in calculating the nonlinear damage value of the horizontal component of the input signal by the horizontal polarization component compensation unit 21, multiple sampling timings may be selected for each sampling point, and the nonlinear damage value of the horizontal component of the input signal may be calculated at the multiple sampling timings of the sampling point. Preferably, three sampling timings may be selected, and the description of the embodiment of the present invention is given below taking that three sampling timings are selected as an example; however, the present invention is not limited thereto. Wherein, the nonlinear damage value of the horizontal component of the input signal is a product of a value of the horizontal component of the input signal at sampling time (n−l), with a value at sampling time (n−m) and a conjugate of a value at sampling time (n−k), and the coefficients of nonlinear items at this sampling point. Where, n is still the timing of an output signal, and l, m, k are three time intervals, l∈(−∞~+∞), m∈(−∞~+∞), k∈(−∞~+∞), and preferably, l+m−k=0.

In an embodiment, in calculating the crosstalk value caused by the vertical component of the input signal to the horizontal component of the input signal by the horizontal polarization component compensation unit 21, similar to calculating the nonlinear damage value of the horizontal component of the input signal, multiple sampling timings may be selected for each sampling point, and the crosstalk value caused by the vertical component of the input signal to the horizontal component of the input signal may be calculated at the multiple sampling timings at the sampling point. Wherein, the selected sampling timings are the same as those selected above for calculating the nonlinear damage value. Wherein, the crosstalk value caused by the vertical component of the input signal to the horizontal component of the input signal is a product of a value of the horizontal component of the input signal at sampling time (n−l) with a value of the vertical component of the input signal at sampling time (n−m) and a conjugate of a value of the vertical component of the input signal at sampling time (n−k), and the coefficients of nonlinear items at this sampling point. Where, the meanings and value ranges of the coefficients are the same as those described above.

In an embodiment, the horizontal polarization component compensation unit 21 compensates the component of the input signal in the horizontal direction according to the linear damage value, the nonlinear damage value and the crosstalk value, which may be carried out by using the formula below:

$$y\_h(n) = \sum_{p=-\infty}^{+\infty} c_{p,h} x\_h(n-p) + \sum_{p=-\infty}^{+\infty} c_{p,v} x\_v(n-p) +$$
$$\sum_{l=-\infty}^{+\infty} \sum_{m=-\infty}^{+\infty} \sum_{k=-\infty}^{+\infty} c_{l,m,k} [x\_h(n-l) x\_h(n-m) x\_h^*(n-k) +$$
$$x\_h(n-l) x\_v(n-m) x\_v^*(n-k)] + \ldots$$

As the nonlinear compensation parts after the third order have little effect on the output signal, the parts after the third order are not taken into consideration in a preferred embodiment of the present invention; that is, the "..." in the above formula may be neglected.

Where, x_h is a horizontal component in an input dual-polarization signal, and y_h is a horizontal component in an output dual-polarization signal. Preferably, l+m−k=0, and therefore, the above formula may be simplified as:

$$y\_h(n) = \sum_{p=-\infty}^{+\infty} c_{p,h} x\_h(n-p) + \sum_{p=-\infty}^{+\infty} c_{p,v} x\_v(n-p) +$$
$$\sum_{l=-\infty}^{+\infty} \sum_{m=-\infty}^{+\infty} c_{l,m,l+m} [x\_h(n-l) x\_h(n-m) x\_h^*(n-l-m) +$$
$$x\_h(n-l) x\_v(n-m) x\_v^*(n-l-m)] + \ldots$$

Preferably, the numbers of the items of the calculated linear damage and nonlinear damage are cut at 2N+1 successive sampling points, and therefore, the above formula may be simplified as:

$$y\_h(n) = \sum_{p=-N}^{N} c_{p,h} x\_h(n-p) + \sum_{p=-N}^{N} c_{p,v} x\_v(n-p) +$$
$$\sum_{l=-N}^{N} \sum_{m=-N}^{N} c_{l,m,l+m} [x\_h(n-l) x\_h(n-m) x\_h^*(n-l-m) +$$
$$x\_h(n-l) x\_v(n-m) x\_v^*(n-l-m)] + \ldots$$

Figure 3:
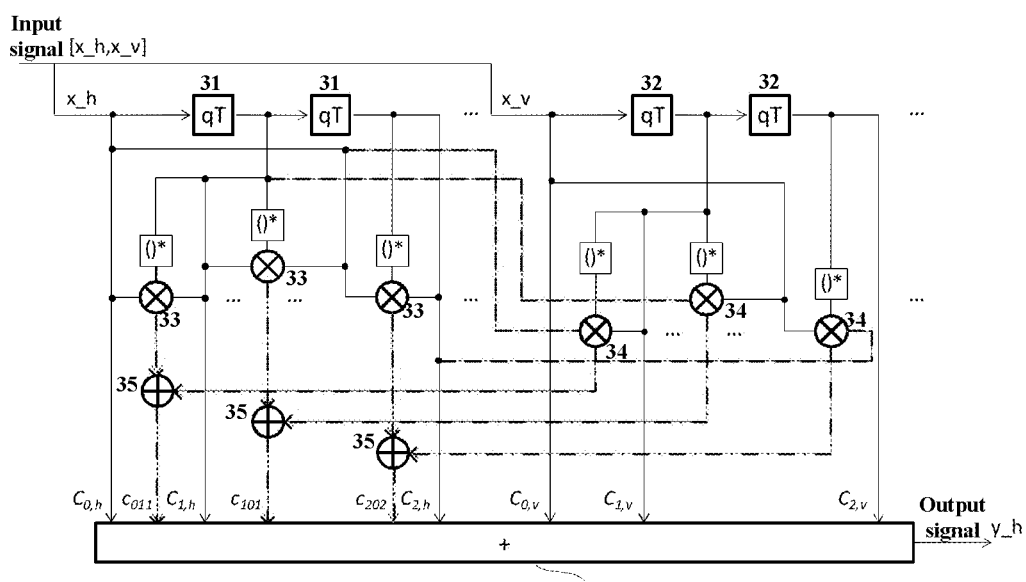
FIG. 3 is a schematic diagram of the structure of a horizontal polarization component compensation unit of the nonlinear compensation apparatus of the embodiment of the present invention.

FIG. 3 is a schematic diagram of the structure of the horizontal polarization component compensation unit of the nonlinear compensation apparatus of the embodiment of the present invention. Referring to FIG. 3, in calculating the linear damage value of the horizontal component of the input signal by the horizontal polarization component compensation unit 21, a linear damage value at one sampling timing of each sampling point is calculated. And in calculating the nonlinear damage value of the horizontal component of the input signal and the crosstalk value caused by the vertical component of the input signal to the horizontal component of the input signal by the horizontal polarization component compensation unit 21, a nonlinear damage value and a crosstalk value at several sampling timings (three sampling timings in FIG. 3) of each sampling point are calculated.

Further referring to FIG. 3, the horizontal polarization component compensation unit 21 comprises: a plurality of first delayers 31, a plurality of second delayers 32, a plurality of first multipliers 33, a plurality of second multipliers 34, a plurality of first adders 35 and a first sum adder 36, wherein, the plurality of first delayers 31 are configured to delay the component of the input signal in a horizontal direction, respectively, according to a sampling interval;

wherein qT is a sampling interval of the adaptive nonlinear equalizer;

the plurality of second delayers 32 are configured to delay the component of the input signal in a vertical direction, respectively, according to the sampling interval;

wherein qT is a sampling interval of the adaptive nonlinear equalizer;

each of the first multipliers 33 is configured to multiply the component of the input signal in a horizontal direction at sampling timing (n−l), the component in a horizontal direction at sampling timing (n−m), and the conjugate of the component in a horizontal direction at sampling timing (n−l−m) of corresponding sampling point, so as to obtain the nonlinear damage value of the component of the input signal in a horizontal direction at this sampling point;

each of the second multipliers 34 is configured to multiply the component of the input signal in a horizontal direction at sampling timing (n−l), the component in a vertical direction at sampling timing (n−m), and the conjugate of the component in a horizontal direction at sampling timing (n−l−m) of corresponding sampling point, so as to obtain the crosstalk value caused by the component of the input signal in a vertical direction to the component in a horizontal direction at this sampling point;

each of the plurality of first adders 35 is configured to add the nonlinear damage value of the component of the input signal in a horizontal direction at the above sampling point with the crosstalk value caused by the component of the input signal in a vertical direction to the component of the input signal in a horizontal direction at the above sampling point;

the first sum adder 36 is configured to add a product of the horizontal component of the input signal and its coefficient of corresponding linear item at each sampling point, a product of the vertical component of the input signal and its coefficient of corresponding linear item at each sampling point, and a product of a calculation result of each of the first adders 35 and its coefficient of corresponding nonlinear item at corresponding sampling point, so as to obtain an output of the component of the input signal in a horizontal direction.

Where, $C_{0,h}$, $C_{1,h}$, $C_{2,h}$ . . . are the coefficients of the linear items to which the horizontal component of the input signal at the sampling points 0, 1, 2 . . . corresponds, respectively, $C_{0,v}$, $C_{1,v}$, $C_{2,v}$ . . . are the coefficients of the linear items to which the vertical component of the input signal at the sampling points 0, 1, 2 . . . corresponds, respectively, and $C_{0,1,1}$, $C_{1,0,1}$, $C_{2,0,2}$ . . . are the coefficients of the nonlinear items to which the input signal at the sampling points 0, 1, 2 . . . corresponds.

The vertical polarization component compensation unit 22 of the embodiment shall be described in detail below with reference to FIG. 4.

In an embodiment, in calculating the linear damage value of the input signal by the vertical polarization component compensation unit 22, the linear damage value of the input signal also comprising a linear damage value of the horizontal component of the input signal and a linear damage value of the vertical component of the input signal. Wherein, the methods of calculation of the linear damage value of the horizontal component of the input signal and the linear damage value of the vertical component of the input signal are identical to those used by the horizontal polarization component compensation unit 21 and shall not be described any further.

In an embodiment, in calculating the nonlinear damage value of the vertical component of the input signal by the vertical polarization component compensation unit 22, similar to calculating the linear damage value of the horizontal component of the input signal by the horizontal polarization component compensation unit 21, multiple sampling timings may be selected for each sampling point, and the nonlinear damage value of the vertical component of the input signal may be calculated at the multiple sampling timings of the sampling point. Preferably, three sampling timings may be selected, and the description of the embodiment of the present invention is given below taking that three sampling timings are selected as an example; however, the present invention is not limited thereto. Wherein, the nonlinear damage value of the vertical component of the input signal is a product of a value of the vertical component of the input signal at sampling time (n−l) with a value at sampling time (n−m) and a conjugate of a value at sampling time (n−k), and the coefficients of nonlinear items at this sampling point. Where, n is still the timing of an output signal, and l, m, k are three time intervals, l∈(−∞·+∞), m∈(−∞·+∞), k∈(−∞·+∞), and preferably, l+m−k=0.

In an embodiment, in calculating a crosstalk value caused by the horizontal component of the input signal to the vertical component of the input signal by the vertical polarization component compensation unit 22, similar to calculating the crosstalk value caused by the vertical component of the input signal to the horizontal component of the input signal by the horizontal polarization component compensation unit 21, multiple sampling timings may be selected for each sampling point, and the crosstalk value caused by the horizontal component of the input signal to the vertical component of the input signal may be calculated at the multiple sampling timings of the sampling point. Wherein, the selected sampling timings are the same as those selected above for calculating the nonlinear damage value. Wherein, the crosstalk value caused by the horizontal component of the input signal to the vertical component of the input signal is a product of a value of the vertical component of the input signal at sampling time (n−l) with a value of the horizontal component of the input signal at sampling time (n−m) and a conjugate of a value of the horizontal component of the input signal at sampling time (n−k), and the coefficients of nonlinear items at this sampling point. Where, the meanings and value ranges of the coefficients are the same as those described above.

In an embodiment, the vertical polarization component compensation unit 22 compensates the component of the input signal in the vertical direction according to the linear damage value, the nonlinear damage value and the crosstalk value, which may be carried out by using the formula below:

$$y\_v(n) = \sum_{p=-\infty}^{+\infty} c_{p,v} x\_v(n-p) + \sum_{p=-\infty}^{+\infty} c_{p,h} x\_h(n-p) +$$

$$\sum_{l=-\infty}^{+\infty} \sum_{m=-\infty}^{+\infty} \sum_{k=-\infty}^{+\infty} c_{l,m,k} [x\_v(n-l) x\_v(n-m) x\_v^*(n-k) +$$

$$x\_v(n-l) x\_h(n-m) x\_h^*(n-k)] + \ldots$$

As the nonlinear compensation parts after the third order have little effect on the output signal, the parts after the third order are not taken into consideration in a preferred embodiment of the present invention; that is, the " . . . " in the above formula may be neglected.

Where, $x\_v$ is a vertical component in an input dual-polarization signal, and $y\_v$ is a vertical component in an output dual-polarization signal. Preferably, l+m−k=0, and therefore, the above formula may be simplified as:

$$y\_v(n) = \sum_{p=-\infty}^{+\infty} c_{p,v} x\_v(n-p) + \sum_{p=-\infty}^{+\infty} c_{p,h} x\_h(n-p) +$$

$$\sum_{l=-\infty}^{+\infty} \sum_{m=-\infty}^{+\infty} c_{l,m,l+m} [x\_v(n-l) x\_v(n-m) x\_v^*(n-l-m) +$$

$$x\_v(n-l) x\_h(n-m) x\_h^*(n-l-m)] + \ldots$$

Preferably, the numbers of the items of the calculated linear damage and nonlinear damage are cut at 2N+1 successive sampling points, and therefore, the above formula may be simplified as:

$$y\_v(n) = \sum_{p=-N}^{N} c_{p,v} x\_v(n-p) + \sum_{p=-N}^{N} c_{p,h} x\_h(n-p) +$$

$$\sum_{l=-N}^{N} \sum_{m=-N}^{N} c_{l,m,l+m} [x\_v(n-l) x\_v(n-m) x\_v^*(n-l-m) +$$

$$x\_v(n-l) x\_h(n-m) x\_h^*(n-l-m)] + \ldots$$

Figure 4:
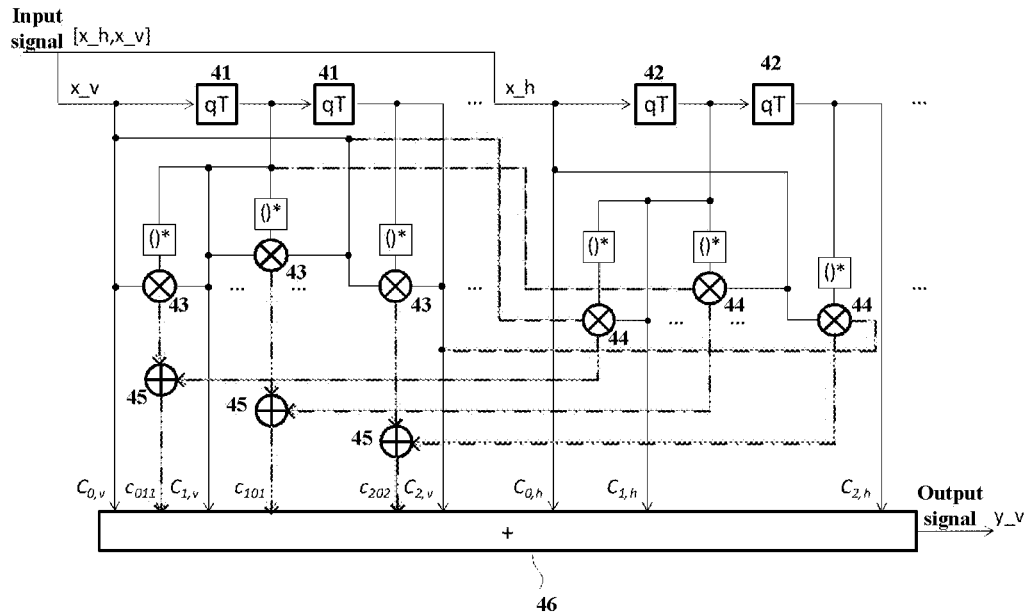
FIG. 4 is a schematic diagram of the structure of a vertical polarization component compensation unit of the nonlinear compensation apparatus of the embodiment of the present invention.

FIG. 4 is a schematic diagram of the structure of the vertical polarization component compensation unit 22 of the nonlinear compensation apparatus of the embodiment of the present invention. Referring to FIG. 4, in calculating a linear damage value of the vertical component of the input signal by the vertical polarization component compensation unit 22, a linear damage value at one sampling timing of each sampling point is calculated. And in calculating the nonlinear damage value of the vertical component of the input signal and the crosstalk value caused by the horizontal component of the input signal to the vertical component of the input signal by the vertical polarization component compensation unit 22, a nonlinear damage value and a crosstalk value at several sampling timings (three sampling timings in FIG. 4) of each sampling point are calculated.

Further referring to FIG. 4, the vertical polarization component compensation unit 22 comprises: a plurality of third delayers 41, a plurality of fourth delayers 42, a plurality of third multipliers 43, a plurality of fourth multipliers 44, a plurality of second adders 45 and a second sum adder 46, wherein, the plurality of third delayers 41 are configured to delay the component of the input signal in a vertical direction, respectively, according to a sampling interval;

the plurality of fourth delayers 42 are configured to delay the component of the input signal in a horizontal direction, respectively, according to the sampling interval;

each of the third multipliers 43 is configured to multiply the component of the input signal in a vertical direction at sampling timing (n−l), the component in a vertical direction at sampling timing (n−m), and the conjugate of the component in a vertical direction at sampling timing (n−l−m) of corresponding sampling point, so as to obtain the nonlinear damage value of the component of the input signal in a vertical direction at the sampling point;

each of the fourth multipliers 44 is configured to multiply the component of the input signal in a vertical direction at sampling timing (n−l), the component in a horizontal direction at sampling timing (n−m), and the conjugate of the component in a horizontal direction at sampling timing (n−l−m) of corresponding sampling point, so as to obtain the crosstalk value caused by the component of the input signal in a horizontal direction to the component in a vertical direction at the sampling point;

each of the second adders 45 are configured to add the nonlinear damage value of the component of the input signal in a vertical direction at corresponding sampling point with the crosstalk value caused by the component of the input signal in a horizontal direction to the component in a vertical direction at corresponding sampling point, respectively;

the second sum adder 46 is configured to add a product of the vertical component of the input signal and its coefficient of corresponding linear item at each sampling point, a product of the horizontal component of the input signal and its coefficient of corresponding linear item at each sampling point, and a product of a calculation result of each of the second adders 45 and its coefficient of corresponding nonlinear item at corresponding sampling point, so as to obtain an output of the component of the input signal in a vertical direction.

Where, $C_{0,v}, C_{1,v}, C_{2,v} \ldots$ are the coefficients of the linear items to which the vertical component of the input signal at the sampling points 0, 1, 2 ... corresponds, respectively, $C_{0,h}, C_{1,h}, C_{2,h} \ldots$ are the coefficients of the linear items to which the horizontal component of the input signal at the sampling points 0, 1, 2 ... corresponds, respectively, and $C_{0,1,1}, C_{1,0,1}, C_{2,0,2} \ldots$ are the coefficients of the nonlinear items to which the input signal at the sampling points 0, 1, 2 ... corresponds.

The nonlinear compensation apparatus of the embodiment of the present invention is applicable to an adaptive nonlinear equalizer, which may effectively compensate for intra-channel nonlinear damage of a polarization multiplexing optical communication system. Wherein the coefficients of each of the linear items and nonlinear items of the adaptive nonlinear equalizer, namely, the coefficient of the linear items and nonlinear items mentioned above, may be obtained adaptively by means of recursive least square (RLS) or least mean squares (LMS) and so on. Furthermore, the nonlinear compensation apparatus of the embodiment of the present invention is applicable to various kinds of modulation formats, as such mPSK, mQAM, and mAPSK, etc., and subcarrier multiplexing or OFDM technology.

The embodiments of the present invention provide a method and apparatus for adaptive nonlinear equalization based on a Volterra model of a polarization multiplexing system. By using the new model, that is, the nonlinear compensation apparatus of the embodiment of the present invention, a nonlinear equalizer applicable to a polarization multiplexing optical communication system is constructed by adding a part representative of crosstalk between two single-polarization signals in a nonlinear item to which a delay tap of an adaptive nonlinear equalizer corresponds, thereby more effectively compensating for intra-channel nonlinear damage of a polarization multiplexing optical communication system.

In comparison with a Volterra filter of a conventional adaptive nonlinear equalizer using a Volterra model of a single-polarization system, the adaptive nonlinear equalizer of the embodiment of the present invention improves the performances of a polarization multiplexing system. Following description is given in a manner of comparison.

Figure 5:
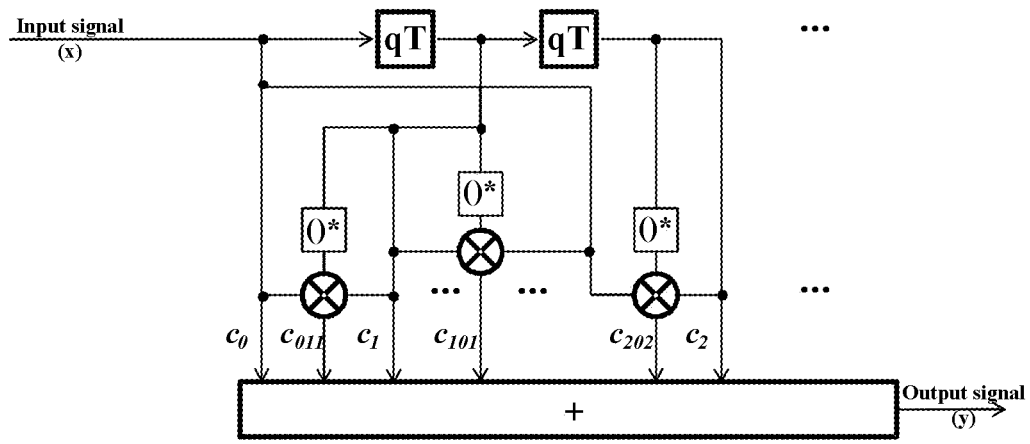
FIG. 5 is a schematic diagram of the structure of a filer of a conventional adaptive nonlinear equalizer.

FIG. 5 is a schematic diagram of the structure of a Volterra filer of a conventional adaptive nonlinear equalizer (ANLE), such as that described in references "Y. Gao, ECOC2009, paper 9.4.7". Wherein, the input signal x is a single-polarization signal, T is duration of each symbol, and qT denotes the sampling interval of the ANLE. In general cases, the same sampling interval is adopted for the linear parts and nonlinear parts in the equalizer. For example, set q to be ½, that is, double oversampling is adopted.

Referring to FIG. 5, the Volterra filer of the conventional ANLE uses a Volterra model of a single-polarization system:

$$y(n) = \sum_{p=-\infty}^{+\infty} c_p x(n-p) + \sum_{l=-\infty}^{+\infty}\sum_{m=-\infty}^{+\infty}\sum_{k=-\infty}^{+\infty} c_{l,m,k} x(n-l)x(n-m)x^*(n-k) + \ldots ;$$

where, x is the input signal of the equalizer, y is the output signal of the equalizer, c is a tap coefficient of the equalizer, and n is the time for outputting the signal. In general, the Volterra filer is simplified by using phase matching conditions, then l+m−k=0, and the above model may be simplified as:

$$y(n) = \sum_{p=-\infty}^{+\infty} c_p x(n-p) + \sum_{l=-\infty}^{+\infty}\sum_{m=-\infty}^{+\infty} c_{l,m,l+m} x(n-l)x(n-m)x^*(n-l-m) + \ldots$$

where, $$\sum_{p=-\infty}^{+\infty} c_p x(n-p)$$

is a linear compensation part, and $$\sum_{l=-\infty}^{+\infty}\sum_{m=-\infty}^{+\infty} c_{l,m,l+m} x(n-l)x(n-m)x^*(n-l-m) + \ldots$$

is a nonlinear compensation part.

As the nonlinear compensation parts after the third order have little effect on the output signal, the parts after the third order are not taken into consideration in the adaptive nonlinear equalizer; that is, $$\sum_{l=-\infty}^{+\infty}\sum_{m=-\infty}^{+\infty} c_{l,m,l+m} x(n-l)x(n-m)x^*(n-l-m)$$

in the above formula is taken as a nonlinear part.

Figure 6:
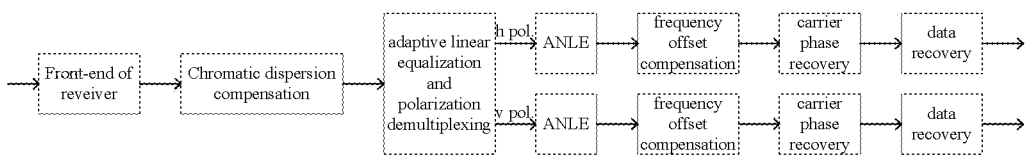
FIG. 6 is a schematic diagram of the composition of a receiver using a conventional adaptive nonlinear equalizer.

If a conventional ANLE is directly applied to a polarization multiplexing system, the two paths of signals are needed to respectively enter into two stand-alone ANLEs of an identical structure, i.e. the structure shown in FIG. 6, refer to reference "Z. Pan, OFC2011, paper JThA40". Crosstalk between two single-polarization signals caused by nonlinearity of an optical fiber is not taken into consideration in a conventional ANLE.

Figure 7:
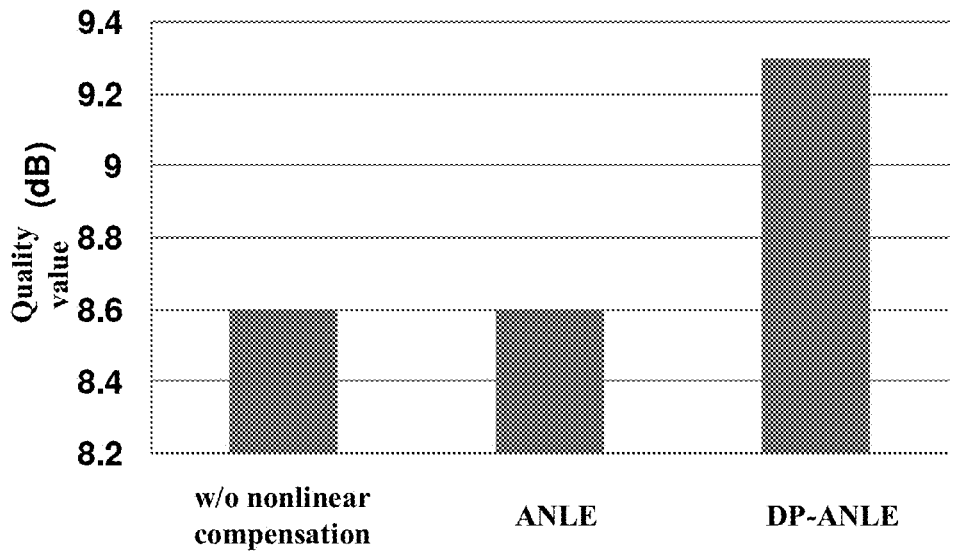
FIG. 7 is a schematic diagram of comparison of performances.

FIG. 7 is a schematic diagram of comparison of performances of a system using a conventional ANLE and using a DP-ANLE of an embodiment of the present invention. Referring to FIG. 7, performances of not using a nonlinear compensator, using a conventional ANLE and using a DP-ANLE of an embodiment of the present invention in an experiment of typical polarization multiplexing long-haul coherent optical transmission are shown. It can be seen from FIG. 7 that the conventional ANLE cannot effectively improve the performances of a polarization multiplexing system, while the DP-ANLE of an embodiment of the present invention can effectively improve the performances of the system.

Embodiment 2

Figure 8A:
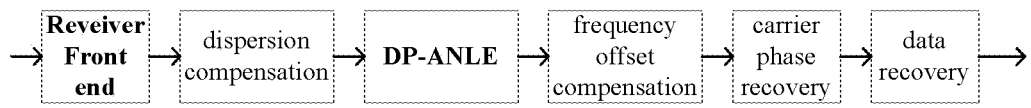
FIGS. 8a-8d are schematic diagrams of the structure of a receiver of an embodiment of the present invention.
Figure 8B:
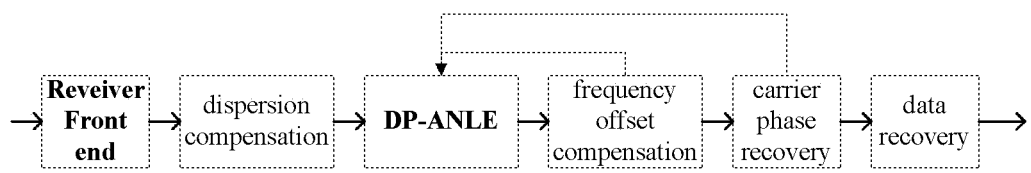
Figure 8C:
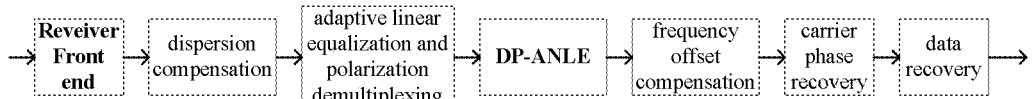
Figure 8D:
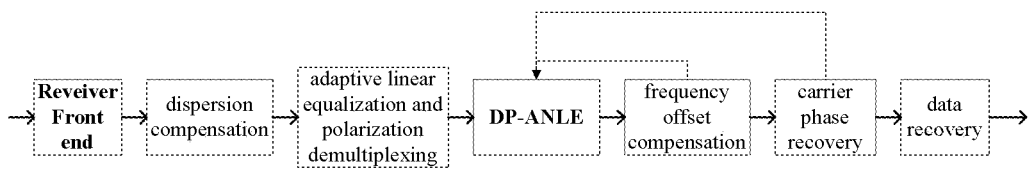

An embodiment of the present invention further provides a receiver used for a polarization multiplexing optical communication system. FIGS. 8a-8d give a position of a DP-ANLE using the nonlinear compensation apparatus of an embodiment of the present invention in a coherent receiver. The DP-ANLE may be disposed after a dispersion compensation apparatus and before a frequency offset compensation apparatus and a carrier phase recovery apparatus, as shown in FIG. 8a. If there exists influence of a frequency offset or a phase noise, the output of the subsequent frequency offset compensation apparatus and carrier phase recovery apparatus may be fed back to the DP-ANLE, as shown in FIG. 8b. If necessary, an adaptive linear equalization and polarization demultiplexing apparatus may be provided before the DP-ANLE, as shown in FIGS. 8c and 8d.

Refer to applications for patent Nos. 200710196347.8 and 200710188795.3 for the structure of a typical coherent receiver. Other apparatuses of the receiver shown in FIGS. 8a-8d, such as the dispersion compensation, adaptive linear equalization and polarization demultiplexing, frequency offset compensation, phase recovery, and data recovery apparatuses and so on, may be implemented by using various known technologies, which shall not be described any further.

Particularly, referring to FIG. 8a, the receiver used for a polarization multiplexing optical communication system comprises:

a receiver front end 81;

a dispersion compensation apparatus 82 connected to the receiver front end 81;

an adaptive nonlinear equalizer 83 connected to the dispersion compensation apparatus 82;

a frequency offset compensation apparatus 84 connected to the adaptive nonlinear equalizer 83;

a carrier phase recovery apparatus 85 connected to the frequency offset compensation apparatus 84;

a data recovery apparatus 86 connected to the carrier phase recovery apparatus 85.

In this embodiment, the receiver front end 81, dispersion compensation apparatus 82, frequency offset compensation apparatus 84, carrier phase recovery apparatus 85 and data recovery apparatus 86 may be implemented by using existing means, which shall not be described any further. Wherein, the adaptive nonlinear equalizer 83 may be implemented by the nonlinear compensation apparatus of Embodiment 1. The detailed description of the nonlinear compensation apparatus is given in Embodiment 1, and the contents are incorporated herein, which shall not be described any further.

In an embodiment, if there exists influence of a frequency offset or a phase noise, the output of the subsequent frequency offset compensation apparatus 84 and carrier phase recovery apparatus 85 may be fed back to the DP-ANLE, as shown in FIG. 8b.

In another embodiment, an adaptive linear equalization and polarization demultiplexing apparatus 87 may be provided before the DP-ANLE 83, as shown in FIGS. 8c and 8d.

As shown in the experimental data in Embodiment 1, the use of the nonlinear compensation apparatus of Embodiment 1 as an adaptive nonlinear equalizer may effectively compensate for intra-channel nonlinear damage of a polarization multiplexing optical communication system and improve performances of the system.

Embodiment 3

An embodiment of the present invention further provides a polarization multiplexing optical communication system, wherein the system comprises the receiver of Embodiment 2, the receiver of Embodiment 2 comprises the nonlinear compensation apparatus of Embodiment 1.

The detailed description of the nonlinear compensation apparatus is given in Embodiment 1, which shall not be described any further.

With the polarization multiplexing optical communication system of the embodiment of the present invention, the intra-channel nonlinear damage of a polarization multiplexing optical communication system is effectively compensated for, and the performances of the system are improved.

Embodiment 4

An embodiment of the present invention further provides an adaptive nonlinear compensation method. FIG. 9 is a flow-chart of the method of the embodiment of the present invention. Referring to FIG. 9, the method comprises:

a horizontal polarization component compensation step 91 of calculating a linear damage value of an input signal, a nonlinear damage value of a component of the input signal in a horizontal direction and a crosstalk value caused by a component of the input signal in a vertical direction to the component of the input signal in a horizontal direction according to the input signal, and compensating the component of the input signal in a horizontal direction according to the linear damage value, the nonlinear damage value and the crosstalk value; and a vertical polarization component compensation step 92 of calculating a linear damage value of the input signal, a nonlinear damage value of a component of the input signal in a vertical direction and a crosstalk value caused by the component of the input signal in a horizontal direction to the component of the input signal in a vertical direction according to the input signal, and compensating the component of the input signal in a vertical direction according to the linear damage value, the nonlinear damage value and the crosstalk value.

In this embodiment, the orders of steps 91 and 92 are not limited. For example, step 92 may be carried out first, and then step 91 is carried out; or steps 91 and 92 are carried out simultaneously. Preferably, steps 91 and 92 are carried out simultaneously.

Wherein, the horizontal polarization component compensation step may particularly be: calculating the linear damage value of the input signal at one sampling timing of each sampling point, and calculating the nonlinear damage value of the component of the input signal in a horizontal direction and the crosstalk value caused by the component of the input signal in a vertical direction to the component of the input signal in a horizontal direction at several sampling timings of each sampling point, according to the input signal.

Wherein the horizontal polarization component compensation step comprises:

delaying the component of the input signal in a horizontal direction according to a sampling interval;

delaying the component of the input signal in a vertical direction according to the sampling interval;

multiplying the component of the input signal in a horizontal direction at sampling timing (n−l), the component in a horizontal direction at sampling timing (n−m), and the conjugate of the component in a horizontal direction at sampling timing (n−l−m) of each sampling point, so as to obtain the nonlinear damage value of the component of the input signal in a horizontal direction at this sampling point;

multiplying the component of the input signal in a horizontal direction at sampling timing (n−l), the component in a vertical direction at sampling timing (n−m), and the conjugate of the component in a horizontal direction at sampling timing (n−l−m) of each sampling point, so as to obtain the crosstalk value caused by the component of the input signal in a vertical direction to the component in a horizontal direction at this sampling point;

adding the nonlinear damage value of the component of the input signal in a horizontal direction at each sampling point with the crosstalk value caused by the component of the input signal in a vertical direction to the component in a horizontal direction at each sampling point;

adding a product of the horizontal component of the input signal and its coefficient of corresponding linear item at each sampling point, a product of the vertical component of the input signal and its coefficient of corresponding linear item at each sampling point, and a product of a sum of a nonlinear damage value and a crosstalk value at each sampling point and its coefficient of corresponding nonlinear item at corresponding sampling point, so as to obtain an output of the component of the input signal in a horizontal direction.

Wherein, the vertical polarization component compensation step may particularly be: calculating the linear damage value of the input signal at one sampling timing of each sampling point, and calculating the nonlinear damage value of the component of the input signal in a vertical direction and the crosstalk value caused by the component of the input signal in a horizontal direction to the component of the input signal in a vertical direction at several sampling timings of each sampling point, according to the input signal.

Wherein the vertical polarization component compensation step comprises:

delaying the component of the input signal in a vertical direction according to a sampling interval;

delaying the component of the input signal in a horizontal direction according to the sampling interval;

multiplying the component of the input signal in a vertical direction at sampling timing (n−l), the component in a vertical direction at sampling timing (n−m), and the conjugate of the component in a vertical direction at sampling timing (n−l−m) of each sampling point, so as to obtain the nonlinear damage value of the component of the input signal in a vertical direction at this sampling point;

multiplying the component of the input signal in a vertical direction at sampling timing (n−l), the component in a horizontal direction at sampling timing (n−m), and the conjugate of the component in a horizontal direction at sampling timing (n−l−m) of each sampling point, so as to obtain the crosstalk value caused by the component of the input signal in a horizontal direction to the component in a vertical direction at this sampling point;

adding the nonlinear damage value of the component of the input signal in a vertical direction at each sampling point with the crosstalk value caused by the component of the input signal in a horizontal direction to the component in a vertical direction at each sampling point, respectively;

adding a product of the vertical component of the input signal and its coefficient of corresponding linear item at each sampling point, a product of the horizontal component of the input signal and its coefficient of corresponding linear item at each sampling point, and a product of a sum of a nonlinear damage value and a crosstalk value at each sampling point and its coefficient of corresponding nonlinear item at corresponding sampling point, so as to obtain an output of the component of the input signal in a vertical direction.

The principle of this embodiment for solving problems is similar to that of Embodiment 1, the implementation of Embodiment 1 may be referred to for the implementation of this embodiment, and the repeated parts shall not be described any further.

With the adaptive nonlinear compensation method of an embodiment of the present invention, Intra-channel nonlinear damage of a polarization multiplexing optical communication system is effectively compensated for, and the performances of the system are improved.

An embodiment of the present invention further provides a computer-readable program, wherein when the program is executed in an equalizer of a coherent receiver, the program enables the computer to carry out the method of Embodiment 4 in the equalizer.

An embodiment of the present invention further provides a storage medium in which a computer-readable program is stored, wherein the computer-readable program enables the computer to carry out the method of Embodiment 4 in an equalizer of a coherent receiver.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

For the implementation of the present invention containing the above embodiments, following supplements are further disclosed.

Supplement 1. A nonlinear compensation apparatus used in an adaptive nonlinear equalizer, comprising:

a horizontal polarization component compensation unit configured to calculate a linear damage value of an input signal according to the input signal, calculate a nonlinear damage value of a component of the input signal in a horizontal direction and a crosstalk value caused by a component of the input signal in a vertical direction to the component of the input signal in a horizontal direction according to the input signal, and compensate the component of the input signal in a horizontal direction according to the linear damage value, the nonlinear damage value and the crosstalk value; and a vertical polarization component compensation unit configured to calculate a linear damage value of the input signal according to the input signal, calculate a nonlinear damage value of a component of the input signal in a vertical direction and a crosstalk value caused by a component of the input signal in a horizontal direction to the component of the input signal in a vertical direction according to the input signal, and compensate the component of the input signal in a vertical direction according to the linear damage value, the nonlinear damage value and the crosstalk value.

Supplement 2. The apparatus according to supplement 1, wherein the horizontal polarization component compensation unit is configured to calculate the nonlinear damage value of the component of the input signal in a horizontal direction, and the crosstalk value caused by the component of the input signal in a vertical direction to the component of the input signal in a horizontal direction at several sampling timings of each sampling point, according to the input signal.

Supplement 3. The apparatus according to supplement 2, wherein the horizontal polarization component compensation unit comprises: a plurality of first delayers, a plurality of second delayers, a plurality of first multipliers, a plurality of second multipliers, a plurality of first adders and a first sum adder, wherein, the plurality of first delayers are configured to delay the component of the input signal in a horizontal direction, respectively, according to a sampling interval;

the plurality of second delayers are configured to delay the component of the input signal in a vertical direction, respectively, according to the sampling interval;

each of the first multipliers is configured to multiply the component of the input signal in a horizontal direction at sampling timing (n–l), the component in a horizontal direction at sampling timing (n–m), and the conjugate of the component in a horizontal direction at sampling timing (n–l–m) of corresponding sampling point, so as to obtain the nonlinear damage value of the component of the input signal in a horizontal direction at the sampling point;

each of the second multipliers is configured to multiply the component of the input signal in a horizontal direction at sampling timing (n–l), the component in a vertical direction at sampling timing (n–m), and the conjugate of the component in a vertical direction at sampling timing (n–l–m) of corresponding sampling point, so as to obtain the crosstalk value caused by the component of the input signal in a vertical direction to the component in a horizontal direction at the sampling point;

the plurality of first adders are configured to add the nonlinear damage value of the component of the input signal in a horizontal direction at the corresponding sampling point with the crosstalk value caused by the component of the input signal in a vertical direction to the component in a horizontal direction at the corresponding sampling point, respectively; and the first sum adder is configured to add a product of the horizontal component of the input signal and its coefficient of corresponding linear item at each sampling point, a product of the vertical component of the input signal and its coefficient of corresponding linear item at each sampling point, and a product of a calculation result of each of the first adders and its coefficient of corresponding nonlinear item at corresponding sampling point, so as to obtain an output of the component of the input signal in a horizontal direction.

Supplement 4. The apparatus according to supplement 1, wherein the vertical polarization component compensation unit is configured to calculate the nonlinear damage value of the component of the input signal in a vertical direction, and the crosstalk value caused by the component of the input signal in a horizontal direction to the component of the input signal in a vertical direction at several sampling timings of each sampling point, according to the input signal.

Supplement 5. The apparatus according to supplement 4, wherein the vertical polarization component compensation unit comprises: a plurality of third delayers, a plurality of fourth delayers, a plurality of third multipliers, a plurality of fourth multipliers, a plurality of second adders and a second sum adder, wherein, the plurality of third delayers are configured to delay the component of the input signal in a vertical direction, respectively, according to a sampling interval;

the plurality of fourth delayers are configured to delay the component of the input signal in a horizontal direction, respectively, according to the sampling interval;

each of the third multipliers is configured to multiply the component of the input signal in a vertical direction at sampling timing (n–l), the component in a vertical direction at sampling timing (n–m), and the conjugate of the component in a vertical direction at sampling timing (n–l–m) of corresponding sampling point, so as to obtain the nonlinear damage value of the component of the input signal in a vertical direction at the sampling point;

each of the fourth multipliers is configured to multiply the component of the input signal in a vertical direction at sampling timing (n–l), the component in a horizontal direction at sampling timing (n–m), and the conjugate of the component in a horizontal direction at sampling timing (n–l–m) of corresponding sampling point, so as to obtain the crosstalk value caused by the component of the input signal in a horizontal direction to the component in a vertical direction at the sampling point;

each of the second adders is configured to add the nonlinear damage value of the component of the input signal in a vertical direction at corresponding sampling point with the crosstalk value caused by the component of the input signal in a horizontal direction to the component in a vertical direction at corresponding sampling point, respectively;

the second sum adder is configured to add a product of the vertical component of the input signal and its coefficient of corresponding linear item at each sampling point, a product of the horizontal component of the input signal and its coefficient of corresponding linear item at each sampling point, and a product of a calculation result of each of the second adders and its coefficient of corresponding nonlinear item at corresponding sampling point, so as to obtain an output of the component of the input signal in a vertical direction.

Supplement 6. A receiver used for a polarization multiplexing optical communication system, comprising:

a receiver front end;

a dispersion compensation apparatus connected to the receiver front end;

an adaptive nonlinear equalizer connected to the dispersion compensation apparatus;

a frequency offset compensation apparatus connected to the adaptive nonlinear equalizer;

a carrier phase recovery apparatus connected to the frequency offset compensation apparatus;

a data recovery apparatus connected to the carrier phase recovery apparatus;

wherein the adaptive nonlinear equalizer is implemented through the nonlinear compensation apparatus according to any of supplements 1 to 5.

Supplement 7. The receiver according to supplement 6, further comprising: an adaptive linear equalization and polarization demultiplexing apparatus disposed between the dispersion compensation apparatus and the adaptive nonlinear equalizer.

Supplement 8. The receiver according to supplement 6 or 7, wherein the frequency offset compensation apparatus is further configured to feed a frequency offset compensation result back to the adaptive nonlinear equalizer; and the carrier phase recovery apparatus is further configured to feed a phase recovery result back to the adaptive nonlinear equalizer.

Supplement 9. A polarization multiplexing optical communication system, comprising the receiver as stated in any one of supplements 4 to 6.

Supplement 10. An adaptive nonlinear compensation method, comprising:

a horizontal polarization component compensation step of calculating a linear damage value of an input signal, a nonlinear damage value of a component of the input signal in a horizontal direction and a crosstalk value caused by a component of the input signal in a vertical direction to the component of the input signal in a horizontal direction according to the input signal, and compensating the component of the input signal in a horizontal direction according to the linear damage value, the nonlinear damage value and the crosstalk value; and a vertical polarization component compensation step of calculating a linear damage value of the input signal, a nonlinear damage value of a component of the input signal in a vertical direction and a crosstalk value caused by the component of the input signal in a horizontal direction to the component of the input signal in a vertical direction according to the input signal, and compensating the component of the input signal in a vertical direction according to the linear damage value, the nonlinear damage value and the crosstalk value.

Supplement 11. The method according to supplement 10, wherein the horizontal polarization component compensation step may particularly be: calculating the linear damage value of the input signal at one sampling timing of each sampling point, and calculating the nonlinear damage value of the component of the input signal in a horizontal direction and the crosstalk value caused by the component of the input signal in a vertical direction to the component of the input signal in a horizontal direction at several sampling timings of each sampling point, according to the input signal.

Supplement 12. The method according to supplement 11, wherein the horizontal polarization component compensation step comprises:

delaying the component of the input signal in a horizontal direction according to a sampling interval;

delaying the component of the input signal in a vertical direction according to the sampling interval;

multiplying the component of the input signal in a horizontal direction at sampling timing (n−l), the component in a horizontal direction at sampling timing (n−m), and the conjugate of the component in a horizontal direction at sampling timing (n−l−m) of each sampling point, so as to obtain the nonlinear damage value of the component of the input signal in a horizontal direction at this sampling point;

multiplying the component of the input signal in a horizontal direction at sampling timing (n−l), the component in a vertical direction at sampling timing (n−m), and the conjugate of the component in a horizontal direction at sampling timing (n−l−m) of each sampling point, so as to obtain the crosstalk value caused by the component of the input signal in a vertical direction to the component in a horizontal direction at this sampling point;

adding the nonlinear damage value of the component of the input signal in a horizontal direction at each sampling point with the crosstalk value caused by the component of the input signal in a vertical direction to the component in a horizontal direction at each sampling point;

adding a product of the horizontal component of the input signal and its coefficient of corresponding linear item at each sampling point, a product of the vertical component of the input signal and its coefficient of corresponding linear item at each sampling point, and a product of a sum of a nonlinear damage value and a crosstalk value at each sampling point and its coefficient of corresponding nonlinear item at corresponding sampling point, so as to obtain an output of the component of the input signal in a horizontal direction.

Supplement 13. The method according to supplement 10, wherein the vertical polarization component compensation step may particularly be: calculating the linear damage value of the input signal at one sampling timing of each sampling point, and calculating the linear damage value of the component of the input signal in a vertical direction and the crosstalk value caused by the component of the input signal in a horizontal direction to the component of the input signal in a vertical direction at several sampling timings of each sampling point, according to the input signal.

Supplement 14. The method according to supplement 13, wherein the vertical polarization component compensation step comprises:

delaying the component of the input signal in a vertical direction according to a sampling interval;

delaying the component of the input signal in a horizontal direction according to the sampling interval;

multiplying the component of the input signal in a vertical direction at sampling timing (n−l), the component in a vertical direction at sampling timing (n−m), and the conjugate of the component in a vertical direction at sampling timing (n−l−m) of each sampling point, so as to obtain the nonlinear damage value of the component of the input signal in a vertical direction at the sampling point;

multiplying the component of the input signal in a vertical direction at sampling timing (n−l), the component in a horizontal direction at sampling timing (n−m), and the conjugate of the component in a horizontal direction at sampling timing (n−l−m) of each sampling point, so as to obtain the crosstalk value caused by the component of the input signal in a horizontal direction to the component in a vertical direction at the corresponding sampling point;

adding the nonlinear damage value of the component of the input signal in a vertical direction at each sampling point with the crosstalk value caused by the component of the input signal in a horizontal direction to the component in a vertical direction at each sampling point, respectively;

adding a product of the vertical component of the input signal and its coefficient of corresponding linear item at each sampling point, a product of the horizontal component of the input signal and its coefficient of corresponding linear item at each sampling point, and a product of a sum of a nonlinear damage value and a crosstalk value at each sampling point and its coefficient of corresponding nonlinear item at corresponding sampling point, so as to obtain an output of the component of the input signal in a vertical direction.

Supplement 15. A computer-readable program, wherein when the program is executed in an equalizer of a coherent receiver, the program enables the computer to carry out the method as stated in supplements 10-14 in the equalizer.

Supplement 16. A storage medium in which a computer-readable program is stored, wherein the computer-readable program enables the computer to carry out the method as stated in supplements 10-14 in an equalizer of a coherent receiver.

The invention claimed is:

1. A nonlinear compensation apparatus used in an adaptive nonlinear equalizer, comprising:

a horizontal polarization component compensation unit configured to calculate a linear damage value of an input signal according to the input signal, calculate a nonlinear damage value of a component of the input signal in a horizontal direction and a crosstalk value caused by the component of the input signal in a vertical direction to the component of the input signal in the horizontal direction according to the input signal, and compensate the component of the input signal in the horizontal direction according to the linear damage value, the nonlinear damage value and the crosstalk value calculated by the horizontal polarization component compensation unit; and a vertical polarization component compensation unit configured to calculate the linear damage value of the input signal according to the input signal, calculate the nonlinear damage value of the component of the input signal in the vertical direction and a crosstalk value caused by the component of the input signal in the horizontal direction to the component of the input signal in the vertical direction according to the input signal, and compensate the component of the input signal in the vertical direction according to the linear damage value, the nonlinear damage value and the crosstalk value calculated by the vertical polarization component compensation unit.

2. The apparatus according to claim 1, wherein the horizontal polarization component compensation unit calculates the nonlinear damage value of the component of the input signal in the horizontal direction, and the crosstalk value caused by the component of the input signal in the vertical direction to the component of the input signal in the horizontal direction at several sampling timings for each sampling point, according to the input signal.

3. The apparatus according to claim 2, wherein the horizontal polarization component compensation unit comprises: a plurality of first delayers, a plurality of second delayers, a plurality of first multipliers, a plurality of second multipliers, a plurality of first adders and a first sum adder, wherein, the plurality of first delayers are configured to delay the component of the input signal in the horizontal direction, respectively, according to a sampling interval;

the plurality of second delayers are configured to delay the component of the input signal in the vertical direction, respectively, according to the sampling interval;

each of the first multipliers is configured to multiply the component of the input signal in the horizontal direction at sampling timing (n−l), the component in the horizontal direction at sampling timing (n−m) by the conjugate of the component in the horizontal direction at sampling timing (n−l−m) for corresponding sampling point, so as to obtain the nonlinear damage value of the component of the input signal in the horizontal direction at the corresponding sampling point;

each of the second multipliers is configured to multiply the component of the input signal in the horizontal direction at sampling timing (n−l), the component in the vertical direction at sampling timing (n−m) by the conjugate of the component in the horizontal direction at sampling timing (n−l−m) for corresponding sampling point, so as to obtain the crosstalk value caused by the component of the input signal in the vertical direction to the component in the horizontal direction at the corresponding sampling point;

the plurality of first adders are configured to add the nonlinear damage value of the component of the input signal in the horizontal direction at the corresponding sampling point with the crosstalk value caused by the component of the input signal in the vertical direction to the component in the horizontal direction at the corresponding sampling point, respectively;

the first sum adder is configured to add a product of the component of the input signal in the horizontal direction and its coefficient of corresponding linear item at each sampling point, a product of the component of the input signal in the vertical direction and its coefficient of corresponding linear item at each sampling point, and a product of a calculation result of each of the first adders and its coefficient of corresponding linear item at corresponding sampling point, so as to obtain an output of the component of the input signal in the horizontal direction.

4. The apparatus according to claim 1, wherein the vertical polarization component compensation unit calculates the nonlinear damage value of the component of the input signal in the vertical direction, and the crosstalk value caused by the component of the input signal in the horizontal direction to the component of the input signal in the vertical direction at several sampling timings for each sampling point, according to the input signal.

5. The apparatus according to claim 4, wherein the vertical polarization component compensation unit comprises: a plurality of third delayers, a plurality of fourth delayers, a plurality of third multipliers, a plurality of fourth multipliers, a plurality of second adders and a second sum adder, wherein, the plurality of third delayers are configured to delay the component of the input signal in the vertical direction, respectively, according to a sampling interval;

the plurality of fourth delayers are configured to delay the component of the input signal in the horizontal direction, respectively, according to the sampling interval;

each of the third multipliers is configured to multiply the component of the input signal in the vertical direction at sampling timing (n−l), the component in the vertical direction at sampling timing (n−m) by the conjugate of the component in the vertical direction at sampling timing (n−l−m) at corresponding sampling point, so as to obtain the nonlinear damage value of the component of the input signal in the vertical direction at the corresponding sampling point;

each of the fourth multipliers is configured to multiply the component of the input signal in the vertical direction at sampling timing (n−l), the component in the horizontal direction at sampling timing (n−m) by the conjugate of the component in the horizontal direction at sampling timing (n−l−m) at corresponding sampling point, so as to obtain the crosstalk value caused by the component of the input signal in the horizontal direction to the component in the vertical direction at the corresponding sampling point;

each of the second adders are configured to add the nonlinear damage value of the component of the input signal in the vertical direction at corresponding sampling point with the crosstalk value caused by the component of the input signal in the horizontal direction to the component in the vertical direction at corresponding sampling point, respectively;

the second sum adder is configured to add a product of the component of the input signal in the vertical direction and its coefficient of corresponding linear item at each sampling point, a product of the component of the input signal in the horizontal direction and its coefficient of corresponding linear item at each sampling point, and a product of a calculation result of each of the second adders and its coefficient of corresponding linear item at corresponding sampling point, so as to obtain an output of the component of the input signal in the vertical direction.

6. A receiver used for a polarization multiplexing optical communication system, comprising:
   a receiver front end;
   a dispersion compensation apparatus connected to the receiver front end;
   an adaptive nonlinear equalizer connected to the dispersion compensation apparatus;
   a frequency offset compensation apparatus connected to the adaptive nonlinear equalizer;
   a carrier phase recovery apparatus connected to the frequency offset compensation apparatus;
   a data recovery apparatus connected to the carrier phase recovery apparatus;
   wherein the adaptive nonlinear equalizer is implemented through the nonlinear compensation apparatus according to claim 1.

7. The receiver according to claim 6, further comprising:
   an adaptive linear equalization and polarization demultiplexing apparatus disposed between the dispersion compensation apparatus and the adaptive nonlinear equalizer.

8. The receiver according to claim 6, wherein the frequency offset compensation apparatus is further configured to feed a frequency offset compensation result back to the adaptive nonlinear equalizer; and the carrier phase recovery apparatus is further configured to feed a phase recovery result back to the adaptive nonlinear equalizer.

9. A polarization multiplexing optical communication system, comprising the receiver according to claim 6.

10. The receiver according to claim 7, wherein the frequency offset compensation apparatus is further configured to feed a frequency offset compensation result back to the adaptive nonlinear equalizer; and the carrier phase recovery apparatus is further configured to feed a phase recovery result back to the adaptive nonlinear equalizer.

11. A polarization multiplexing optical communication system, comprising the receiver according to claim 7.

12. An adaptive nonlinear compensation method, comprising:
   a horizontal polarization component compensation step of calculating a linear damage value of an input signal, a nonlinear damage value of a component of the input signal in a horizontal direction and a crosstalk value caused by the component of the input signal in a vertical direction to the component of the input signal in the horizontal direction according to the input signal, and compensating the component of the input signal in the horizontal direction according to the linear damage value, the nonlinear damage value and the crosstalk value calculated in the horizontal polarization component compensation step; and
   a vertical polarization component compensation step of calculating the linear damage value of the input signal, the nonlinear damage value of the component of the input signal in the vertical direction and a crosstalk value caused by the component of the input signal in the horizontal direction to the component of the input signal in the vertical direction according to the input signal, and compensating the component of the input signal in the vertical direction according to the linear damage value, the nonlinear damage value and the crosstalk value calculated in the horizontal polarization component compensation step.

* * * * *